United States Patent [19]

Funada

[11] Patent Number: 4,858,220
[45] Date of Patent: Aug. 15, 1989

[54] LASER CONTROL CIRCUIT FOR OPTICAL DATA RECORDING/REPRODUCTION APPARATUS

[75] Inventor: Saburo Funada, Tokyo, Japan
[73] Assignee: Olympus Optical Co., Ltd., Tokyo, Japan
[21] Appl. No.: 108,374
[22] Filed: Oct. 14, 1987

[30] Foreign Application Priority Data

Oct. 20, 1986 [JP] Japan ............................ 61-249378

[51] Int. Cl.$^4$ ............................................. G11B 7/125
[52] U.S. Cl. .................................................... 369/116
[58] Field of Search .................. 369/116, 121, 122, 53, 369/54; 346/76 L; 455/611, 613

[56] References Cited

U.S. PATENT DOCUMENTS

| | | | |
|---|---|---|---|
| 4,051,329 | 9/1977 | Blondet et al. | 369/116 |
| 4,150,402 | 4/1979 | Tietze et al. | 369/116 |
| 4,507,767 | 3/1985 | Takasugi | 369/54 |
| 4,509,156 | 4/1985 | Ohara et al. | 369/54 |
| 4,685,097 | 8/1987 | van der Put | 369/54 |
| 4,698,797 | 10/1987 | Komatsu | 369/116 |
| 4,747,091 | 5/1988 | Doi | 369/116 |

FOREIGN PATENT DOCUMENTS

| | | | |
|---|---|---|---|
| 61-192044 | 8/1966 | Japan | 369/122 |
| 60-143438 | 7/1985 | Japan | 369/116 |
| 62-89248 | 4/1987 | Japan | 369/116 |
| 62-129950 | 6/1987 | Japan . | |

Primary Examiner—Donald McElheny, Jr.
Attorney, Agent, or Firm—Frishauf, Holtz, Goodman & Woodward

[57] ABSTRACT

A laser controller for an optical data recording/reproducing apparatus includes a detector for detecting an intensity of a laser beam emitted from a laser, a servo controller for comparing the detected value with a reference value and generating a feedback signal in accordance with the difference between the two values, and a drive circuit for supplying a drive signal corresponding to the feedback signal to the laser, and a modulator for modulating the drive signal during recording. Furthermore, the laser controller includes a controller connected to the servo controller, a RAM, a timer, and a temperature sensor which are connected to the controller. When reproduction and erasing are to be performed, the operation of the modulator is stopped, and the drive signal is obtained by feedback control. When erasing is to be performed, a level of the feedback signal is stored in the RAM. When recording is to be performed, the operation of the servo controller is stopped, while the level of the stored feedback signal read out from the RAM is supplied to the drive circuit. As a result, the intensity of the laser beam is not controlled by feedback control, but by open loop control based on the readout feedback signal, while the intensity of the laser beam is modulated in accordance with the data to be recorded.

17 Claims, 7 Drawing Sheets

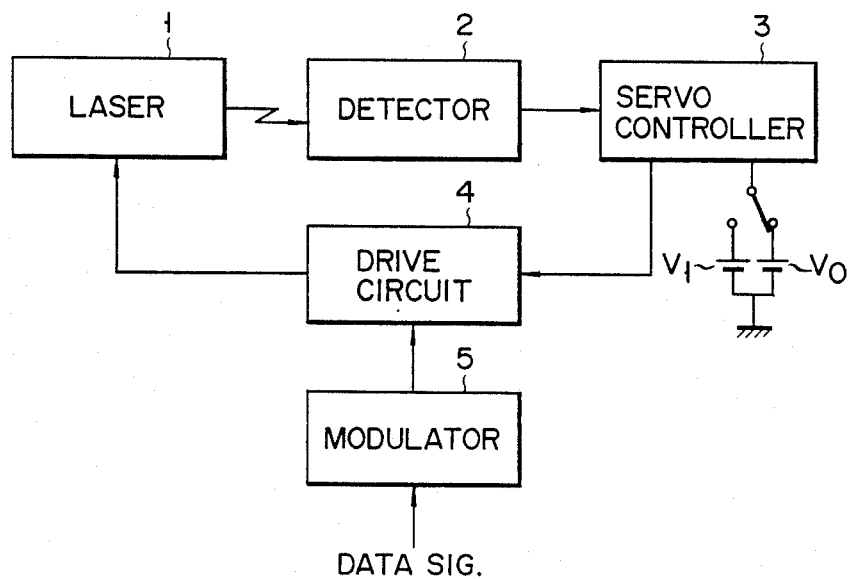
FIG. 1 (PRIOR ART)
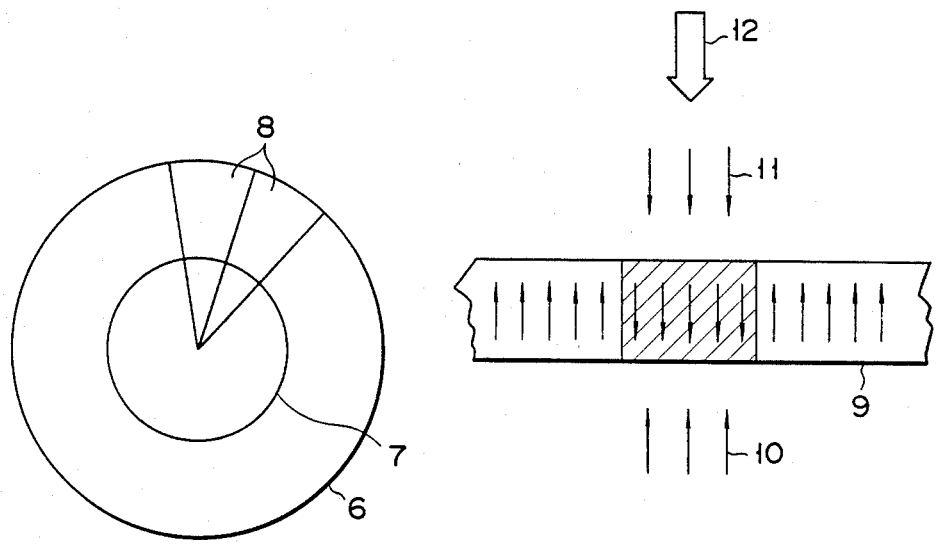
FIG. 2
FIG. 3

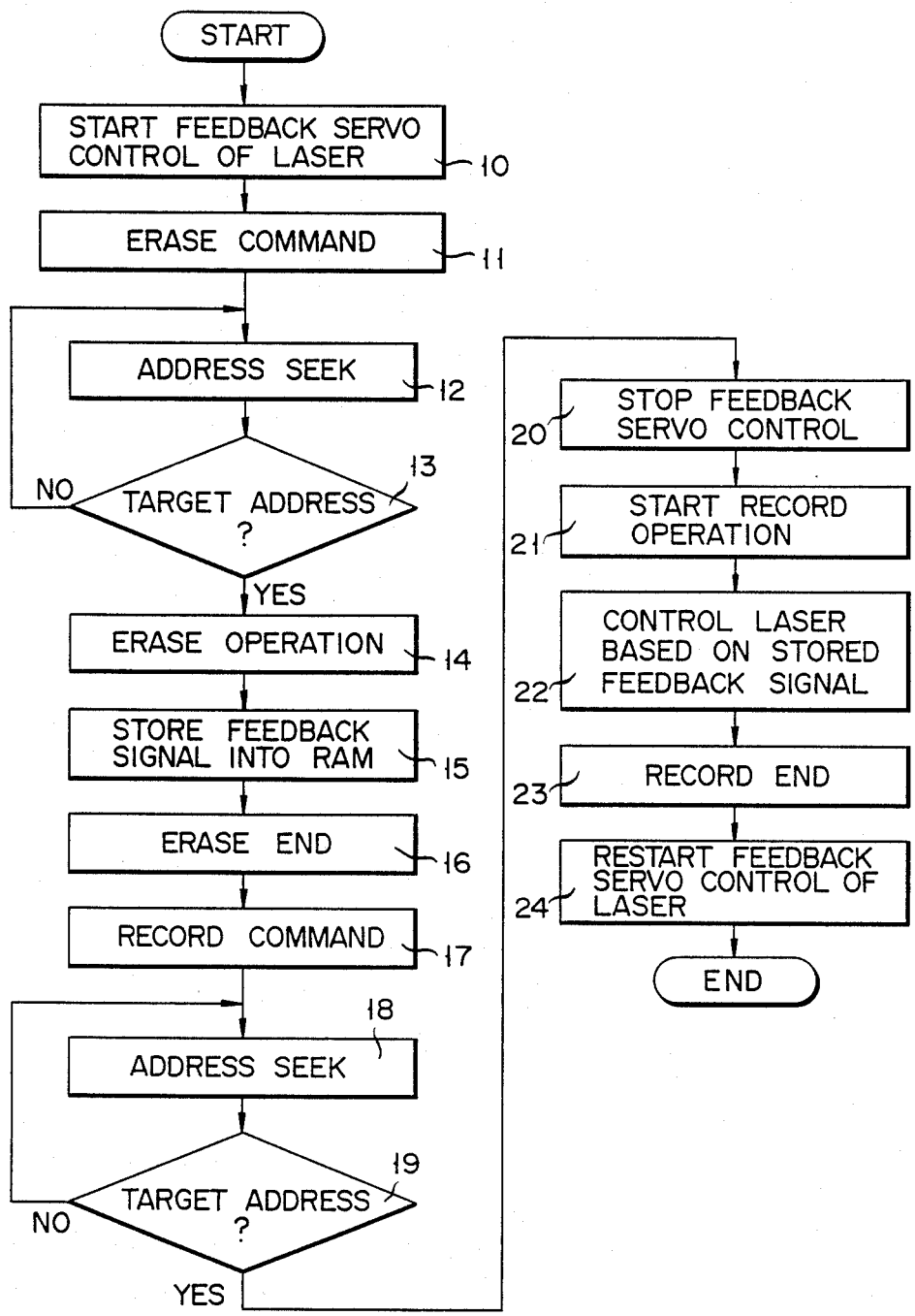
F I G. 6

LASER CONTROL CIRCUIT FOR OPTICAL DATA RECORDING/REPRODUCTION APPARATUS

BACKGROUND OF THE INVENTION

The present invention relates to a laser emission controller for an optical data recording apparatus for recording data using a laser beam.

Recently, an optical data recording/reproducing apparatus for optically recording and reproducing data using an optical recording medium, or an optical magnetic recording apparatus for magneto-optically recording, reproducing, and erasing data using a magneto-optical recording medium has been developed. In such an apparatus, an intensity of a laser beam for recording is modulated between a low level and a high level in accordance with a level of data to be recorded, i.e., level "0" or level "1". An intensity of a laser beam for reproduction is low and it may be set equal to the low level of the recording mode. An intensity of a laser beam for erasure is high and it may be set equal to the high level of the recording mode. If the intensity of the laser beam required for each mode varies, the intensity must be controlled in accordance with a corresponding mode. However, since a laser source is very sensitive to changes in environmental conditions such as a temperature, a slight change therein can change an intensity of light. In addition, the source itself is deteriorated due to use over a long period of time, and the characteristics of the source change, thereby posing problems such as a decrease in intensity of light.

In order to cope with this, feedback servo control has been performed using a conventional controller shown in FIG. 1. A laser beam radiated from a rear side of laser 1 is detected by detector 2 including a photodetector such as a PIN photodiode. Servo controller 3 compares the detected value with a reference value and controls a drive signal supplied to laser 1 through drive circuit 4 in accordance with the difference. Reference values include low reference voltage V0 for the reproduction mode and high reference voltage V1 for the recording and erasing modes. Modulator 5 for receiving a data signal to be recorded is connected to drive circuit 4. Modulator 5 modulates a level of the drive signal in accordance with the data signal in the recording mode.

The conventional controller feeds back a monitored detection output to drive circuit 4 for all the modes, i.e., recording, reproduction, and erasing modes in the above manner, thereby controlling changes in intensity of a laser beam in a real-time manner. The feedback servo control poses no problem as long as the laser beams for reproduction and erasure are not modulated. However, the following problems are posed when the laser beam is modulated for recording.

When detector 2 detects an intensity of a laser beam by obtaining the mean value thereof, it does not pose a problem if the mean value is calculated using a method of obtaining substantially constant interval mean values, such as Modified-Modified Frequency Modulation ($M^2FM$), Eight-to-Fourteen Modulation (EFM). If a method different from the above method is used, such as Return-to-Bias (RB), Return-to-Zero (RZ), the mean value greatly change due to variations in level "0" and level "1" of the data to be recorded, and hence stable feedback control cannot be performed.

In addition, assume that detector 2 detects an intensity of a laser beam by peak holding. If a recording system to be employed is a so-called wide pulse recording system, it does not pose a problem. However, if a recording system to be employed is a so-called short pulse recording system for recording only timings of changes in level (0 or 1) of data to be recorded, such as RZ and RB, the pulse width of the drive signal is very short, e.g., 10 ns through 100 ns. Therefore, it is difficult to realize a high-speed peak holding circuit. In this case, therefore, a stable feedback signal cannot be obtained.

The above disadvantage also applies to laser beam modulators used in light transmission apparatuses.

SUMMARY OF THE INVENTION

It is an object of the present invention to provide an optical data recording apparatus capable over stably controlling an intensity of a laser beam which is to be irradiated on a recording medium and has an intensity modulated in accordance with data to be recorded.

In order to achieve the above object of the present invention, there is provided an optical data recording apparatus comprising a detector for detecting an intensity of a nonmodulated laser beam in a mode except for a data recording mode, a first controller for generating a drive signal corresponding to a result of comparison between an output from the detector and a reference signal, and controlling the intensity of the nonmodulated laser beam in the mode except for the data recording mode in accordance with the drive signal, a memory for storing the drive signal generated by the first controller, and a second controller for reading out the drive signal from the memory in response to a recording command, modulating the readout drive signal in accordance with data to be recorded, modulating the intensity of the laser beam in accordance with the modulated drive signal, and controlling the intensity of the modulated laser beam.

BRIEF DESCRIPTION OF THE DRAWINGS

FIG. 1 is a block diagram of a conventional laser controller for an optical data recording/reproducing apparatus;

FIG. 2 is a plan view showing a magneto-optical disk used for the optical data recording/reproducing apparatus according to the present invention;

FIG. 3 is a sectional view showing a perpendicularly magnetized film of a surface of the magneto-optical disk in FIG. 2;

FIG. 6 is a flow chart showing an operation of the first embodiment; and

DETAILED DESCRIPTION OF THE PREFERRED EMBODIMENT

Figure 4:
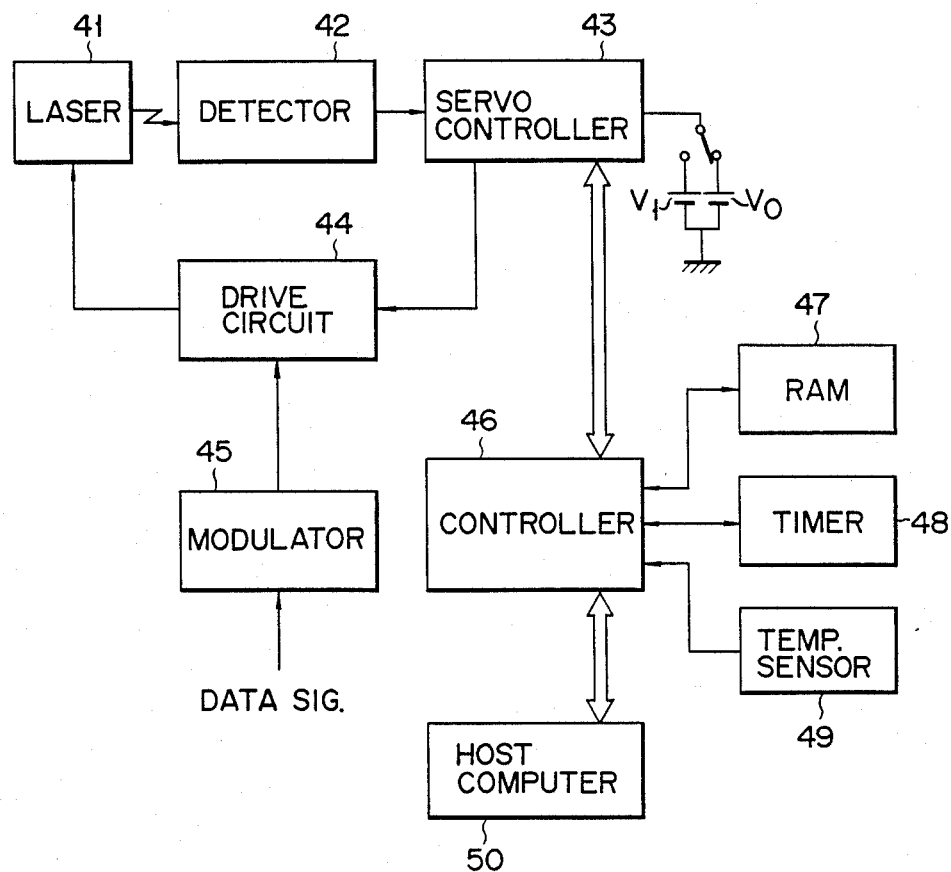
FIG. 4 is a block diagram showing a first embodiment of a laser controller for the optical recording/ reproducing apparatus according to the present invention.

An embodiment of the present invention will be described in detail with reference to the accompanying drawings hereinafter. In this embodiment, magneto-optical disk 6 such as the one shown in FIG. 2 is used as a recording medium. Magneto-optical disk 6 has concentrical or helical tracks 7, each of which is divided into a plurality of sector regions 8 in a circumferential direction of the disk so as to smoothly and quickly perform data recording, reproduction, and erasure.

As shown in FIG. 3, the surface of magneto-optical disk is coated with perpendicularly magnetized film 9. It is possible to rewrite data of the magneto-optical disk. Erasing must be performed on magneto-optical disk 6 prior to data rewrite. When erasing is to be performed, laser beam 12 is perpendicularly radiated on perpendicularly magnetized film 9 while erasing magnetic field 10 is applied in a given direction orthogonal to perpendicularly magnetized film 9 to align the direction of magnetization of perpendicularly magnetized film 9 of a track or a sector whose data is to be erased with the direction of erasing magnetic field 10. When recording is to be performed, laser beam 12 is perpendicularly radiated on perpendicularly, magnetized film 9 while recording magnetic field 11 is applied to perpendicularly magnetized film 9 in a direction opposite to that of erasing magnetic field 10 so as to reverse the direction of magnetization of an irradiated part of perpendicularly magnetized film 9. Therefore, if the laser beam is ON/OFF-modulated in accordance with binary data, directions of magnetization of perpendicularly magnetized film 9 can be set in two directions in accordance with the binary data. When data is rewritten in an optical magnetic disk, erasing must be performed in advance in this manner. A first embodiment that executes the present invention utilizes this principle.

FIG. 4 is a block diagram of the first embodiment of the optical recording/reproducing apparatus according to the present invention utilizing this principle. This embodiment, as in the conventional example, comprises laser 41, detector 42 having a PIN photodiode or the like, servo controller 43 having reference voltages V0 and V1, drive circuit 44, and modulator 45 for receiving data to be recorded. In addition, the apparatus comprises controller 46 connected to servo controller 43 for controlling an operation of each circuit and RAM 47 connected to controller 46. The overall operation is controlled by host computer 50 connected to controller 46. Controller 46 sends an operation command to each part of the apparatus according to a command from host computer 50, receives each detected signal, and sends the next command to each part of the apparatus according to the detected signal. Though timer 48 and temperature sensor 49 are connected to controller 47, they are not used in the first embodiment but are is used in a second embodiment described later.

A laser beam intensity detected by detector 42 is compared with a corresponding reference value by servo controller 43, and a drive signal representing the difference thus obtained is supplied to laser 41 through drive circuit 44. The reference values include low reference voltage V0 for the reproducing mode and high reference voltage V1 for recording and erasing modes. Modulator 45 modulates the drive signal in accordance with a data signal for recording.

When reproduction and erasing are to be performed, the reference voltages are set at V0 and V1, respectively, and the operation of modulator 45 is stopped, so that the drive signal is obtained by the above-described feedback control. The level (since the modulator 45 is not operated, the level is kept unchanged) of an output signal (feedback signal) from servo controller 43 is stored in RAM 47 through controller 46 during erasing. More particularly, the stored data is updated every predetermined time interval during erasing.

In the recording mode, controller 46 sends a command for stopping feedback servo control to servo controller 43, reads out the stored feedback signal from RAM 47, and sends a level of the readout feedback signal to drive circuit 44 through servo controller 43. For this reason, intensity control of the laser beam for recording is not performed by the feedback control, but by the open loop control based on the level of the feedback signal from servo controller 43 during erasing, while the intensity of the laser beam is modulated in accordance with data to be recorded.

An operation of the embodiment will be described in detail.

Figure 5A:
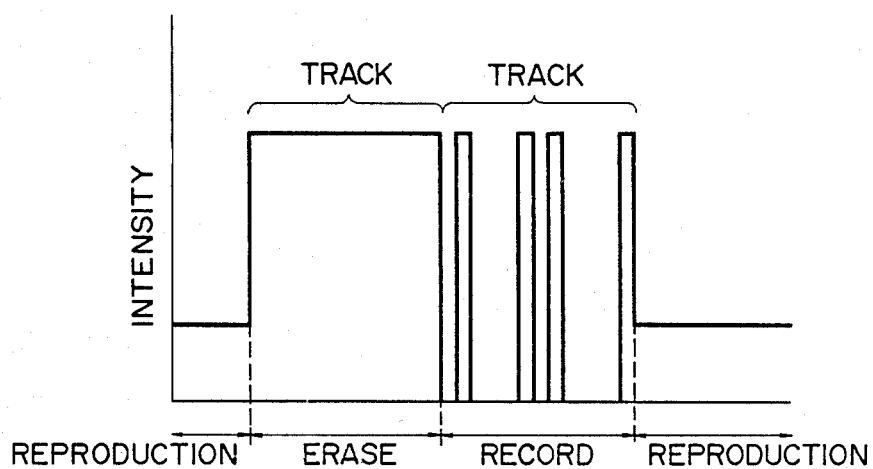
FIGS. 5A and 5B are graphs showing changes in intensity of laser beams.

First, a case wherein all data stored in one track are rewritten will be described. In this case, changes in intensity of the laser beam with the lapse of time are shown in FIG. 5A. As has been described above, when data is to be recorded in the magneto-optical disk, erase operation is performed prior to rewrite operation, and the direction of magnetization of the perpendicularly magnetized film must be aligned with the given direction. For this reason, the track to be used for rewriting is erased using an erasing laser beam which has a level higher than that for the reproduction mode and has been controlled by feedback servo. At this time, the level of the output signal from servo controller 43 is stored (updated) in RAM 47 through controller 46 every predetermined interval. After erasing of the data stored in one track is completed, controller 46 sends a command for stopping feedback servo control and a command for starting recording operation. During recording, controller 46 reads out the feedback signal which has been stored in RAM 47 during erasing. Controller 46 supplies the readout signal to servo controller 43. As a result, the drive signal is not subjected to feedback control, but is subjected to open control based on the feedback signal for erasing, while modulation of the drive signal is performed by modulator 45 in accordance with the data to be recorded.

Figure 5B:
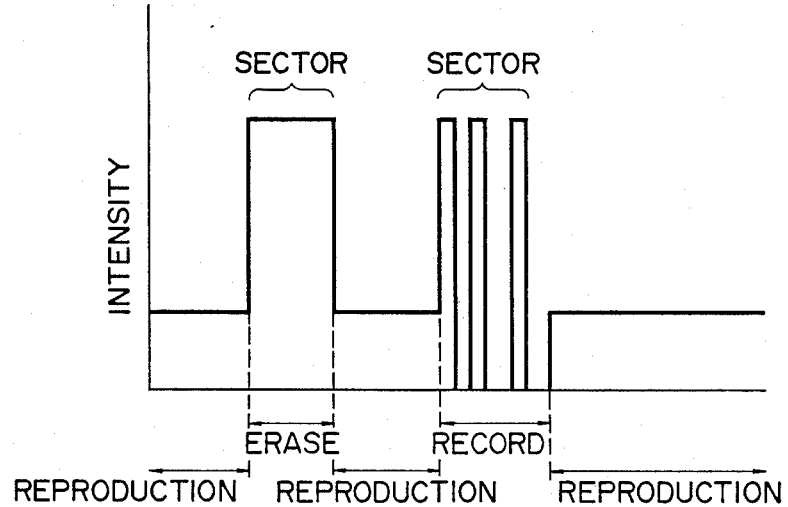

Next, a case wherein only data stored in a sector is re-recorded will be described. Changes in intensity of laser beam with the lapse of time are shown in FIG. 5B. In this case, the operation is performed in the same manner as in the above case. For the sake of convenience, reproductions of track number and sector number, which are generally performed during recording and erasing, are omitted from FIGS. 5A and 5B.

FIG. 6 shows a flow chart showing the operation of intensity control of a laser beam according to the first embodiment and including the above operations. When the operation is started, feedback servo control of laser intensity is started as shown in step 10, wherein low reference voltage V0 is selected as a reference voltage and modulator 45 is not operated. When an erase command is generated in step 11, an address of data to be erased is seeked in step 12. If controller 46 determines in step 13 that the laser beam reaches a position having the target address, erase operation is started in step 14 on the basis of the principle described with reference to FIG. 3. In this step, the reference voltage for feedback servo control of laser intensity is changed to high reference voltage V1. Feedback control signals output from servo controller 43 every predetermined interval are sampled and stored in RAM 47 during the erase operation. As a result, a value of a feedback control signal sampled near the time when erase operation is completed is finally stored in RAM 47 in step 15. Erase operation is finished in step 16.

When a record command is generated in step 17, an address is seeked in step 18 in the same manner as in the erasing mode. When it is confirmed that the target address is seeked in step 19, feedback servo control of the laser intensity is stopped in step 20. Recording operation is started in step 21. A feedback control signal near the end of the erase operation is read out from RAM 47 in step 22, thereby performing control (open loop control) of the intensity of the laser beam on the basis of the readout signal The record operation is based on the principle described with reference to FIG. 3. Drive circuit 44 modulates a drive signal corresponding to the readout feedback signal in accordance with level "0" and level "1" of data to be recorded. When the data is set at level "1", laser 1 may be emitted in accordance with the drive signal generated based on the readout feedback signal, and when the data is set to level "0", laser 1 may be emitted in accordance with the drive signal whose level is lowered in accordance with the ratio of reference voltages V1 and V0.

When a record operation is ended in step 23, feedback servo control of the laser intensity is restarted in step 24. In this case, low voltage V0 is selected as the reference voltage.

In the first embodiment, rewriting can be accurately and quickly performed on only a portion to be rewritten. If a level of drive signal is fixed by an open loop control during recording, the intensity of the laser beam may change due to changes in laser characteristics. However, variation factors such as changes in ambient temperature and degradation with the lapse of time do not show typical variations within a short period of time in practice. In the above two cases, only a short period of time is required from the erase operation to the record operation. Therefore, even if the erasing laser beam is used during recording, any significant problem is not posed.

A case wherein data is recorded in a disk in which data has been erased from a plurality of tracks will be described. In this case, since a considerably long period of time is often required from the erase operation to the record operation, the laser characteristics may be changed due to a decrease in temperature and the like during that period. Therefore, if recording is performed using the erasing laser beam, only an intensity having a level different from an optimal one may be obtained, and hence accurate recording of data may not be performed. In another case, the characteristics may be changed during the recording mode due to the long period of recording time. During a long period of recording operation, the laser itself is heated. The characteristic of laser for recording may be changed from that for erasing. Therefore, in order to cope with these cases, temperature sensor 49 for measuring a temperature around laser 41, and timer 49 for counting a recording time, are connected to controller 46. An allowable variation range is set in controller 46. If a difference between a temperature during erasing (a temperature measured when the feedback signal is stored in RAM 47) and a temperature during recording falls outside the allowable variation range, controller 46 outputs an erase command to perform erasing again prior to the record operation, obtains a feedback signal for a nonmodulated laser beam again, and stores the signal in RAM 47. Furthermore, the controller 46 causes timer 48 to start with recording, performs erase operation every predetermined interval during recording after reading the next sector address, and obtains a new feedback signal for the nonmodulated laser beam.

Figure 7A:
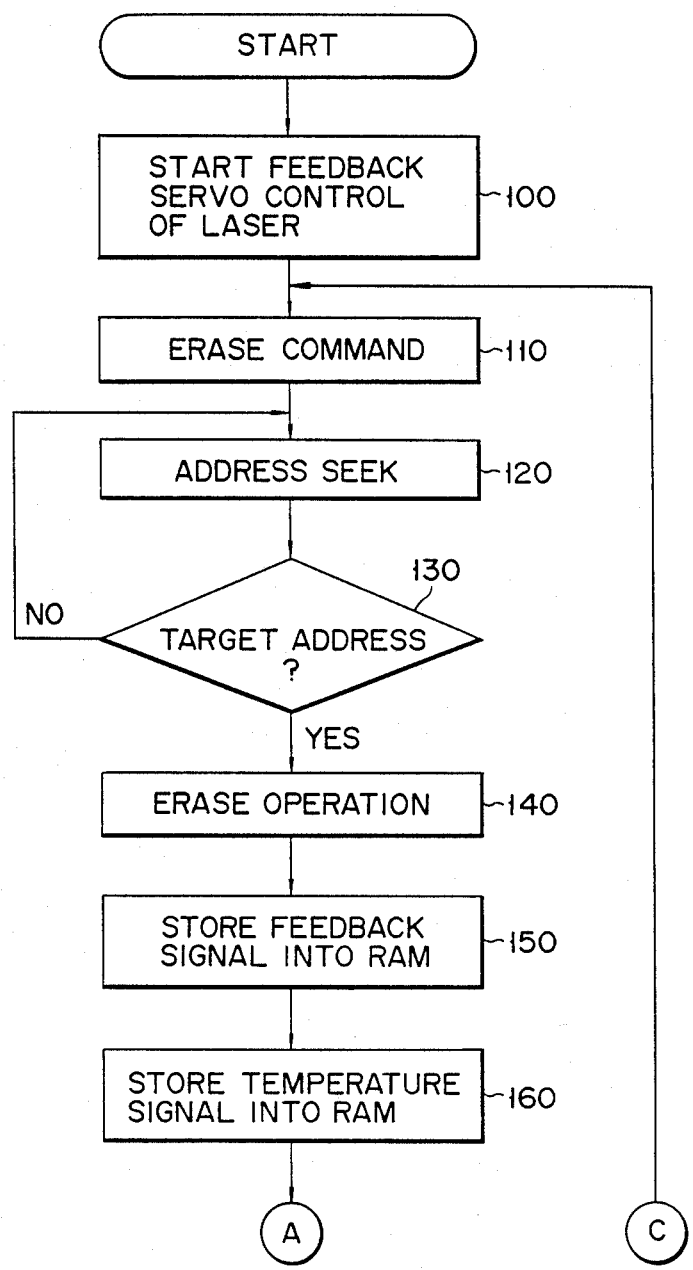
FIGS. 7A, 7B, and 7C are flow charts showing an operation of a second embodiment.
Figure 7B:
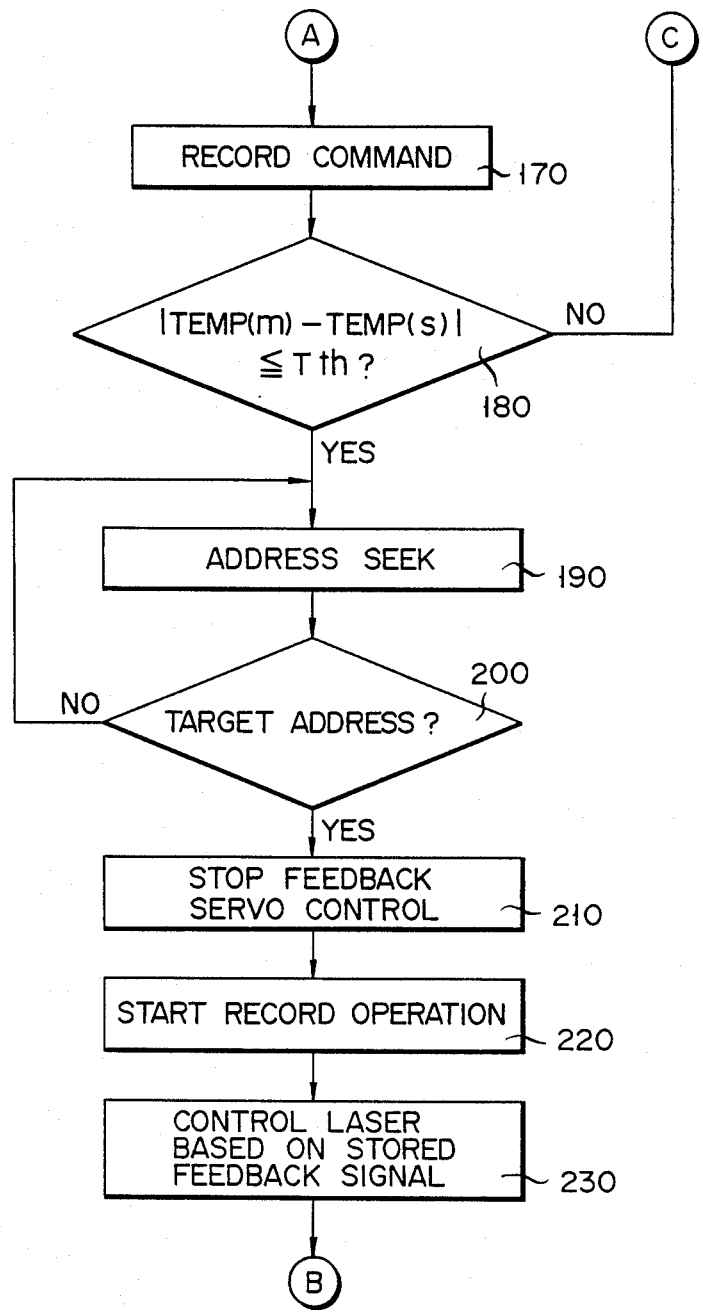
Figure 7C:
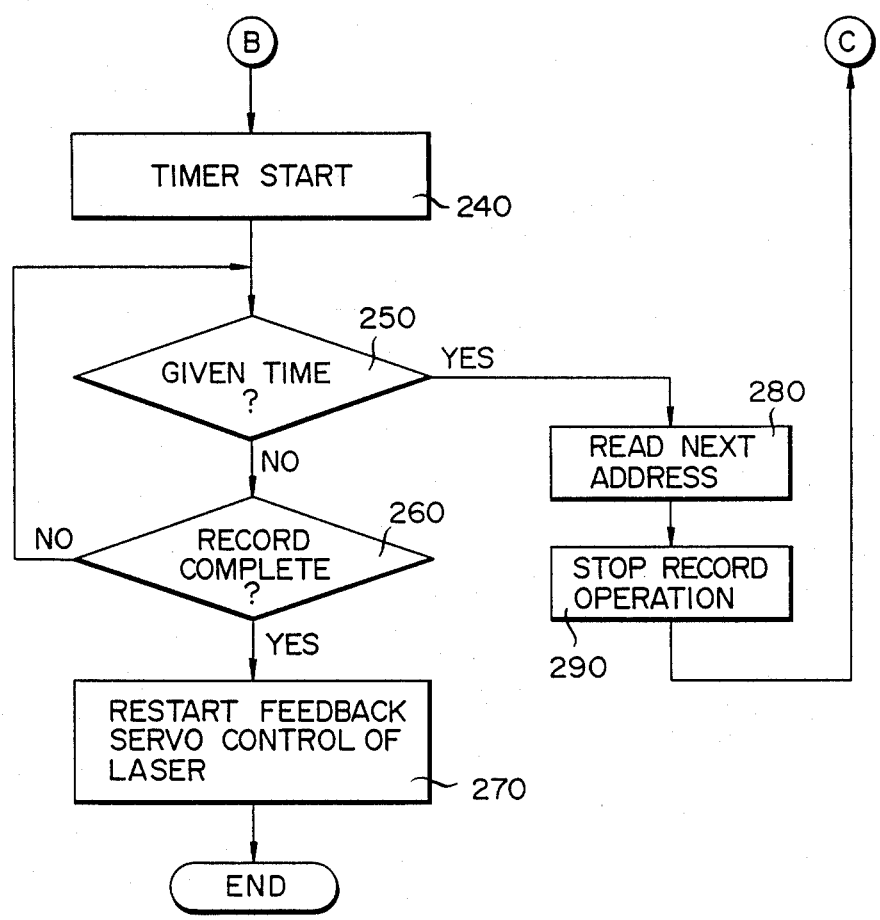

FIGS. 7A to 7C show flow charts showing the operation of intensity control of a laser beam according to a second embodiment and including the above operations. When the operation is started, feedback servo control of laser intensity is started as shown in step 100, wherein low reference voltage V0 is selected as a reference voltage and modulator 45 is not operated. When an erase command is generated in step 110, an address of data to be erased is seeked in step 120. If controller 46 determines in step 130 that the laser beam reaches a position having the target address, erase operation is started in step 140 on the basis of the principle described with reference to FIG. 3. In this step, the reference voltage for feedback servo control of laser intensity is changed to high reference voltage V1. Feedback control signals output from servo controller 43 every predetermined interval are sampled and stored in RAM 47 during the erase operation. As a result, a value of a feedback control signal sampled near the time when erase operation is completed is finally stored in RAM 47 in step 150. When erase operation is finished, detected value TEMP(s) of temperature sensor 49 is stored in RAM 47 in step 160. Since RAM 47 has a backup battery, even if its main power source is turned off, storage power source is turned off after erasing is finished, and the power source is turned on again for recording, continuity of the flow charts is not lost.

When a record command is generated in step 170, stored value TEMP(s) and value TEMP(m) currently detected by temperature sensor 49 are compared with each other, in step 180, to determine whether a temperature difference is smaller than or equal to predetermined value Tth. If the difference is smaller than or equal to predetermined value Tth, the current temperature is not changed compared with that detected during erasing, and hence it can be assumed that the laser characteristics are not changed. As a result, an address is seeked in step 190 in the same manner as in the erasing mode. When it is confirmed that the target address is seeked in step 200, feedback servo control of the laser intensity is stopped in step 210. A recording operation is started in step 220. A feedback control signal near the end of the erase operation is read out from RAM 47 in step 230, thereby performing control (open loop control) of the intensity of the laser beam on the basis of the readout signal. Drive circuit 44 modulates a drive signal corresponding to the readout feedback signal in accordance with level "0" and level "1" of data to be recorded. If the difference is larger than predetermined value Tth in step 180, it means that the current temperature is changed compared with that detected during erasing, and hence it can be assumed that the laser characteristics may be changed. As a result, control flow is returned to step 110 and the feedback signal is re-stored in RAM 47.

After the record operation is started, timer 48 is operated for counting in step 240, thereby determining whether a predetermined period of time has lapsed in step 250. If NO in step 250, it is determined in step 260 whether the record operation is completed. If YES in step 260, feedback servo control of the laser intensity is restarted in step 270. In this case, low voltage V0 is selected as the reference voltage.

If it is determined that in step 250 the predetermined period of time has lapsed, it can be assumed that the laser characteristics may be changed due to the lapse of a long period of time. As a result, a next sector address is read in step 280 and the record operation is stopped in step 290, control flow is returned to step 110.

As is described above, according to the second embodiment, an intensity of an erase laser is feedback-controlled, and a feedback signal at this time is stored in the memory so that an intensity of a record laser is open-loop controlled on the basis of the stored signal, thereby stably controlling the intensity of the laser regardless of a state of data to be recorded. Furthermore, when a laser characteristic change can be predicted compared with that upon storing, the record operation is stopped and the erase operation is performed again so that the feedback signal stored in the memory is updated, thereby coping with the above described case.

Though the second embodiment uses both the timer and temperature sensor, it is possible to omit one of them. If step 140 of FIG. 7C is not executed after step 130 of FIG. 7B but step 23 of FIG. 6 is executed after step 130, the timer can be omitted. If the temperature sensor is to be omitted, steps 160 and 180 will be deleted from FIGS. 7A and 7B.

The present invention is not limited to the above embodiment. RAM 47 is connected to controller 46 since the data recording/reproducing apparatus includes controller 46 including a CPU of servo controller 43. If there is no controller 46 in the recording/reproducing apparatus and servo controller 43 has a CPU, a memory may be arranged in servo controller 43. Timer 48 and temperature sensor 49 may also arranged in servo controller 43. Although the record and erase laser beam intensities are set to equal to each other, they may be different from each other. In this case, a record drive signal can be obtained by multiplying the stored value of the feedback control signal in accordance with the ratio of the record and erase intensities. Furthermore, a reproduction feedback control signal can be stored instead of the erase feedback control signal. Note that since the relationship between the intensities of the reproduction and record laser beams cannot be defined by a simple multiplication, the record drive signal can be obtained by multiplying the stored value of the reproduction feedback control signal after performing predetermined correction.

If the period of time from the end of erasing and the start of recording is long, the feedback signal stored during the erasing may different from the drive signal suitable for recording. To cope with this, it is desired the timer is started upon the end of erasing and if the recording is not started within a predetermined period of time after the end of erasing, the erasing operation is executed once again before the recording operation.

Furthermore, the optical recording system is not limited to a system utilizing the magneto-optical disk, but may be a system utilizing a so-called write-once type (or a DRAW type) optical disk in which erasing cannot be performed. In this case, a specific region exclusively used for feedback control of the laser beam is arranged in the disk, for performing feedback control by irradiating this region with a laser beam having the high level of the recording mode prior to the recording operation, thereby performing a similar operation to the erase operation described above. The system may use a phase change type recording medium capable of overwriting. In this case, feedback control of the high level of the recording mode can be performed using an arbitrary empty region before recording.

Furthermore, the present invention is not limited to the data recording apparatus, but can be applied to any apparatus in which an intensity of a laser beam need be modulated in accordance with data, e.g., a modulator of a laser beam used for an optical transmission apparatus.

As has been described above, according to the present invention, there is provided a laser controller capable of stably performing control when the intensity of a laser beam is modulated in accordance with data.

What is claimed is:

1. A laser controller for modulating an intensity of a laser beam from a laser source in accordance with data, comprising:

feedback control means including means for detecting an intensity of the laser beam, for generating, in a first mode wherein the laser beam is not modulated, a first drive signal to be supplied to the laser source in accordance with a result obtained by comparing an output from said detecting means with a prescribed reference signal to control the intensity of the laser beam;

first storing means for storing the first drive signal; and open loop control means including modulating means for reading out, in a second mode wherein the laser beam is modulated, the first drive signal from said first storing means, and generating a second drive signal to be supplied to the laser source, which has one of a first level corresponding to the readout first drive signal and a second level that is lower than the first level, said first and said second levels being switched in accordance with the data, so as to modulate the intensity of the laser beam.

2. A controller according to claim 1, in which said modulating means includes means for modulating the intensity of the laser beam between an intensity corresponding to the first drive signal and an intensity below the first drive signal.

3. A controller according to claim 1, further comprising:

means for measuring a temperature;

second storing means for storing a temperature when said first storing means stores the first drive signal; and means for comparing a currently measured temperature with the stored temperature during the operation of said modulating means and stopping the operation of said modulating means when a difference between the currently measured temperature and the stored temperature exceeds a predetermined value.

4. A controller according to claim 3, further comprising means for restarting the operation of said feedback control means after the operation of said modulating means is stopped, and causing said first storing means to store a new first drive signal.

5. A controller according to claim 1, further comprising:

counting means for measuring a time from a start of the operation of said modulating means; and means for stopping the operation of said modulating means when the measured time reaches a predetermined period of time.

6. A controller according to claim 5, further comprising means for restarting the operation of said feedback control means after the operation of said modulating means is stopped and causing said first storing means to store a new first drive signal.

7. An optical data recording apparatus for recording data by irradiating a recording medium with a laser beam from a laser source, wherein the laser beam is modulated between a high level and a low level in accordance with data to be recorded, comprising:

means for detecting an intensity of a high lever laser beam in an erase mode;

control means for generating a drive signal in accordance with a result obtained by comprising an output from said detecting means with a reference signal, and controlling the intensity of the high level laser beam in the erase mode in accordance with the drive signal;

first storing means for storing the drive signal; and data recording means for reading out the drive signal from said first storing means in response to a record command, modulating the readout drive signal in accordance with the data to be recorded, modulating the intensity of the laser beam in accordance with the modulated drive signal, and for irradiating the recording medium with the intensity-modulated laser beam.

8. An apparatus according to claim 7, in which said data recording means includes means for modulating the drive signal between a level of the readout drive signal and a level below the level thereof.

9. An apparatus according to claim 7, in which said control means includes feedback servo control means and said recording means includes open loop control means.

10. An apparatus according to claim 7, further comprising:

means for measuring a temperature;

second storing means for storing a temperature when said first storing means stores the drive signal; and means for comparing a currently measured temperature with the stored temperature during the operation of said data recording means and stopping the operation of said data recording means when a difference between the currently measured temperature and the stored temperature exceeds a predetermined value.

11. An apparatus according to claim 10, further comprising means for restarting the operation of said control means after the operation of said data recording means is stopped, and causing said first storing means to store a new drive signal.

12. An apparatus according to claim 7, further comprising:

counting means for measuring a time from a start of the operation of said data recording means; and means for stopping the recording operation of said data recording means when the measured time reaches a predetermined period of time.

13. An apparatus according to claim 12, further comprising means for restarting the operation of said control means after the operation of said data recording means is stopped, and causing said first storing means to store a new drive signal.

14. An apparatus according to claim 7, in which said data recording means includes means for recording data using a magneto-optical disk, and said first storing means includes means for storing a drive signal during erasing prior to recording of data.

15. A method of controlling a recording laser beam from a laser source in an optical data recording apparatus, comprising:

a first step of supplying a nonmodulated drive signal corresponding to a predetermined reference value to the laser source;

a second step of detecting an intensity of a laser beam emitted from the laser source in accordance with the nonmodulated drive signal;

a third step of controlling the drive signal in accordance with a difference between the intensity detected in the second step and the reference value;

a fourth step of storing a value of the drive signal as controlled at the third step; and a fifth step of reading out the value of the stored drive signal in response to a record command, modulating the readout drive signal in accordance with data to be recorded, and irradiating a recording medium with the intensity-modulated laser beam.

16. A method according to claim 15, in which the fourth step includes a step of measuring a temperature and a step for storing the measured temperature, and the fifth step includes a step of measuring a temperature, a step of comparing the measured temperature with the stored temperature, and stopping irradiation of the laser beam when a difference between the measured temperature and the stored temperature exceeds a predetermined value, and a step of restarting the operation from the first step through the fifth step after irradiation of the laser beam is stopped.

17. A method according to claim 15, in which the fifth step includes a step of measuring a time from a start of the operation of the fifth step, a step of stopping irradiation of the laser beam when a measured time reaches a predetermined period of time, and a step of restarting the operation from the first step through the fifth step after irradiation of the laser beam is stopped.

* * * * *

UNITED STATES PATENT AND TRADEMARK OFFICE
CERTIFICATE OF CORRECTION

PATENT NO. : 4,858,220

DATED : August 15, 1989

INVENTOR(S) : Funada, Saburo

It is certified that error appears in the above-identified patent and that said Letters Patent is hereby corrected as shown below:

Title page,
Section [56] References Cited,
Under "FOREIGN PATENT DOCUMENTS" after "61-192044"

change "8/19<u>66</u>" to --8/19<u>86</u>--.

Signed and Sealed this

Twenty-eighth Day of June, 1994

Attest:

BRUCE LEHMAN

Attesting Officer

Commissioner of Patents and Trademarks